United States Patent [19]
Marshall et al.

[11] Patent Number: 5,174,594
[45] Date of Patent: Dec. 29, 1992

[54] HORSE DRAWN VEHICLE IMPROVEMENTS

[75] Inventors: Earl L. Marshall, 19 Longview Dr., Tijeras, N. Mex. 87057; Thomas O'Carroll, Cypress, Tex.

[73] Assignee: Earl L. Marshall, Tijeras, N. Mex.

[21] Appl. No.: 513,664

[22] Filed: Apr. 24, 1990

[51] Int. Cl.⁵ ............................................. B62C 1/02
[52] U.S. Cl. ....................................... 280/63; 280/66; 280/70; 280/155; 280/762; 280/770; 296/180
[58] Field of Search ................ 280/63, 75, 66, 68, 280/70, 762, 770, 155, 181; 296/180

[56] References Cited

U.S. PATENT DOCUMENTS

| | | | |
|---|---|---|---|
| 187,693 | 2/1877 | Wood | 280/63 |
| 292,896 | 2/1884 | Coleman | 280/66 |
| 508,707 | 11/1893 | Harrington | 280/63 |
| 1,110,681 | 9/1914 | Gerstenslager | 280/70 |
| 3,163,438 | 12/1964 | Bliss, Jr. | 280/63 |
| 4,732,401 | 3/1988 | Siemon | 280/63 |
| 4,817,975 | 4/1989 | Saraydar | 280/63 |

Primary Examiner—Andres Kashnikow
Assistant Examiner—Eric Culbreth
Attorney, Agent, or Firm—Robert W. Weig; Deborah A. Peacock; Donovan F. Duggan

[57] ABSTRACT

The disclosure is directed to an improved horse drawn carriage providing several safety and performance features. A transverse shaft tip to shaft tip deflector is fittable over wooden shafts to prevent snagging objects such as trees and fence posts between horse and harness. Wheel deflectors, wheel guards, a low position passenger seat, and a removable rear platform assembly for standing passengers are disclosed.

11 Claims, 3 Drawing Sheets

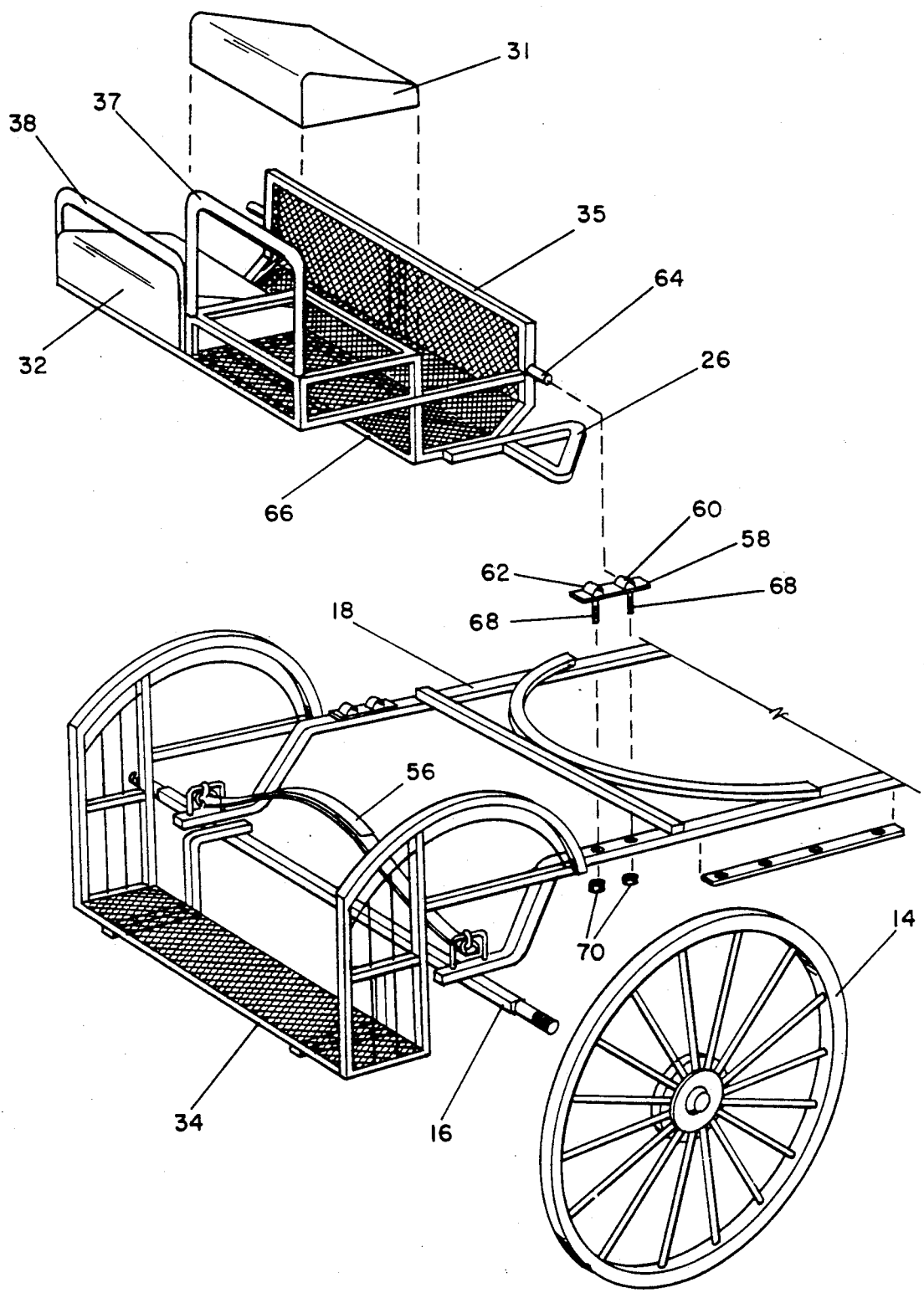
FIG—3

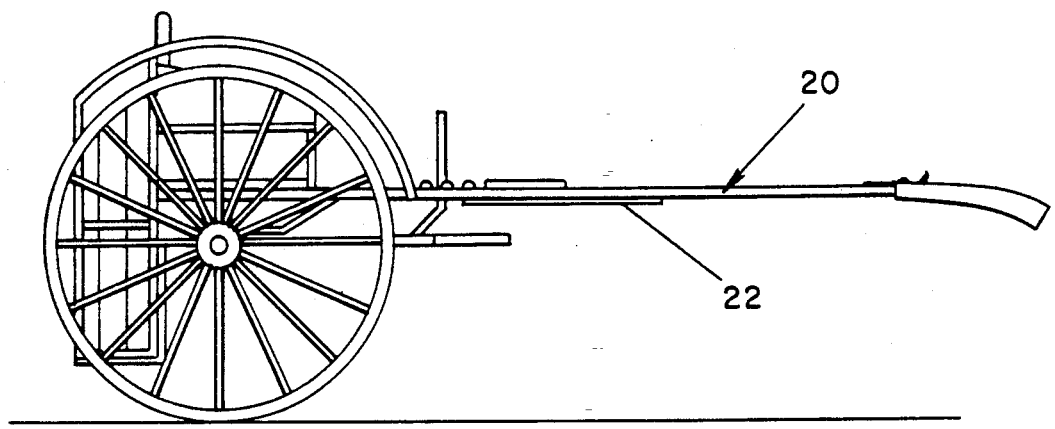
FIG—4
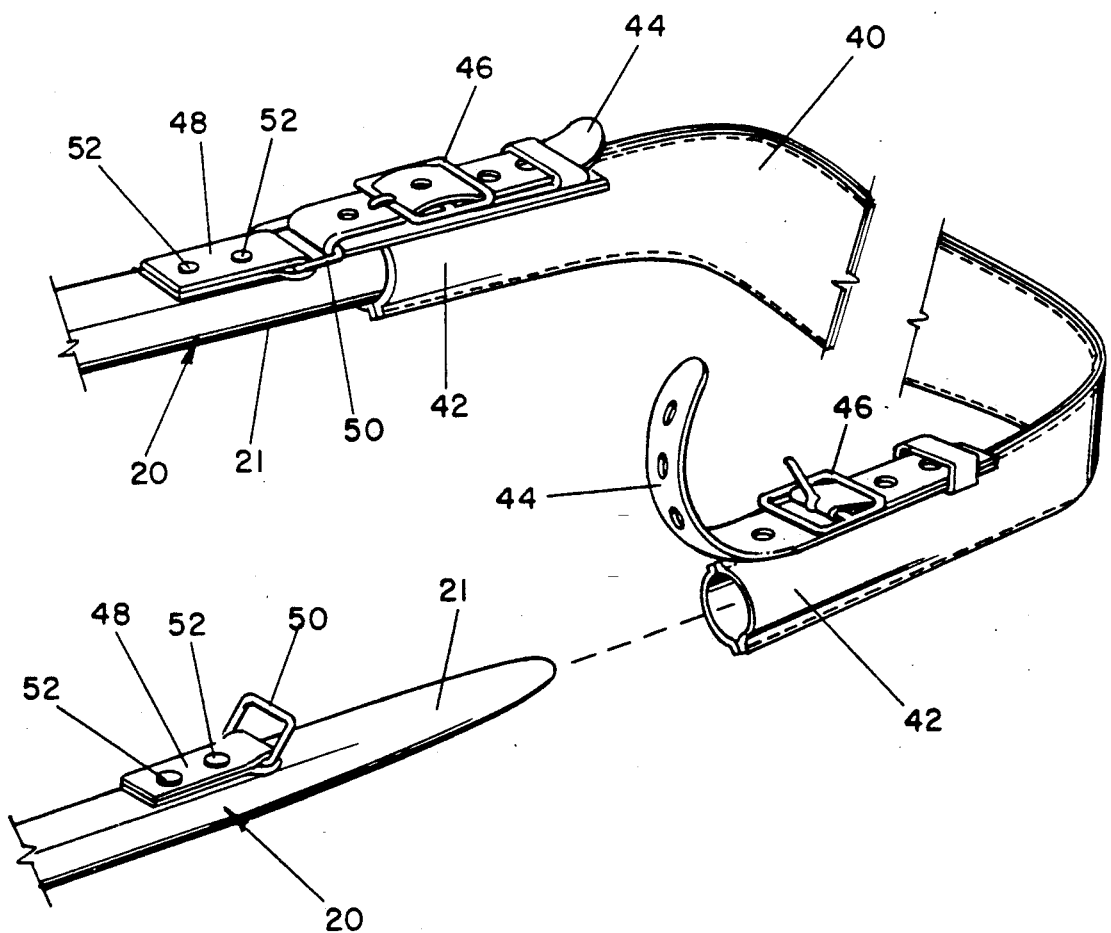
FIG—5

HORSE DRAWN VEHICLE IMPROVEMENTS

BACKGROUND OF THE INVENTION

1. Field of the Invention

The invention relates to horse drawn vehicles and more particularly to safety and performance improvements thereto.

A major problem in negotiating difficult terrain having trees, brush, fence posts, and the like, through which a driver must steer a horse and carriage, is that such objects of the terrain can be snagged between the forward ends of the shafts and the horse. When such an incident occurs at speed or when going downhill, injuries frequently result to the horse and anyone riding in the carriage. Thus, in accordance with the invention, a need for a transverse deflecting member across the forward ends of the shafts exists. Too, the wood shafts in accordance with the invention are reinforced with lengths of steel or other metal supports extending substantially along the undersides thereof to provide additional safety from shaft breakage.

Driver toeholds provided by the invention are also advantageous in aiding a driver in retaining his seated position during fast passage over difficult terrain.

A passenger or navigator rides on the carriage, either adjacent the driver or standing up on a platform provided by the invention behind the driver. The passenger can lean out or in or move from side to side on the platform to counterweigh the carriage when turning or when traversing a slope. The invention provides a removable platform for such a passenger, a low position passenger seat, and a positionable seat assembly for adjusting carriage balance for its use with or without the platform.

During use, it can be tempting, particularly for a passenger, to reach out for a support during movement over rough terrain or when negotiating turns. A passenger could mistakenly grab a rapidly turning wheel rim. To prevent such an occurrence, in accordance with the invention there are provided wheel guard rails, which also prevent inadvertent driver or passenger contact with the wheels.

SUMMARY OF THE INVENTION (DISCLOSURE OF THE INVENTION)

In accordance with the invention there is provided for use on a horse drawn vehicle comprising at least one pair of wheels, a suspension, a carriage housing, and a pair of shafts having forward extending ends and between which a horse is harnessable, improvements comprising structure for bridging the forward ends of the pair of shafts to substantially eliminate the possibility of snagging an object between the end of one of the shafts and the horse, when the vehicle is being pulled by a horse and in motion. The shafts bridging means is preferably semi-resilient and constructed of leather, and shaped to conform about but spaced from the neck of a horse. The shafts bridging structure preferably comprises a transverse member having ends fittable over the forward ends of the shafts and comprising means for affixing the transverse member ends to the forward ends of the shafts.

The invention also comprises, for use on a horse drawn vehicle comprising at least one pair of wheels, a suspension, and a carriage housing, improvements comprising a pair of shafts having forward extending ends between which a horse is harnessable, the shafts being comprised of wood and reinforced thereunder a substantial length thereof with a metal element, and deflectors mounted ahead of the wheels on the carriage whereby an object is deflected away from between the carriage and the wheel, and not snagged therebetween. The invention further comprises arcuate wheel guards for providing gripping members for persons on the vehicle and providing protection from inadvertent gripping of a revolving wheel by any such person and a removable platform for a standing passenger mountable behind the driver's seat. The invention further comprises a positionable driver's seat, mountable in at least two positions for purposes of vehicle balance, a forward position usable when the removable platform is mounted on the vehicle and a rearward position for when the removable platform is removed from the vehicle.

One object of the invention is to provide safety features for horse drawn carriages.

Another object of the present invention is to provide performance enhancement in a horse drawn carriage.

One advantage of the present invention is that difficult terrain containing objects to be avoided can be more safely traversed in a horse drawn carriage in accordance with the invention.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings:

FIG. 3 is an exploded view showing features of the preferred embodiment;

FIG. 4 is a side view of the preferred embodiment; and

FIG. 5 shows a preferred embodiment of the structure for bridging the forward ends of the pair of shafts on the vehicle in accordance with the present invention.

DETAILED DESCRIPTION OF THE PREFERRED EMBODIMENT OF THE INVENTION (BEST MODE FOR CARRYING OUT THE INVENTION)

Figure 1:
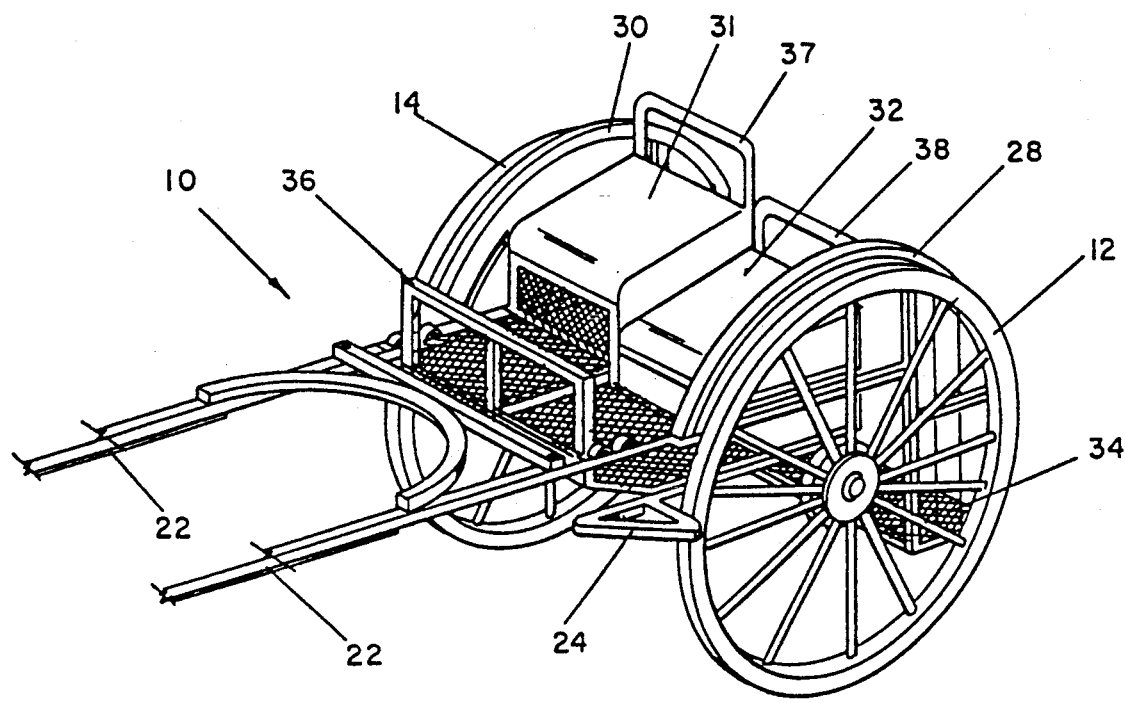
FIG. 1 is a prospective view of a preferred embodiment of a horse drawn vehicle in accordance with the invention.
Figure 2:
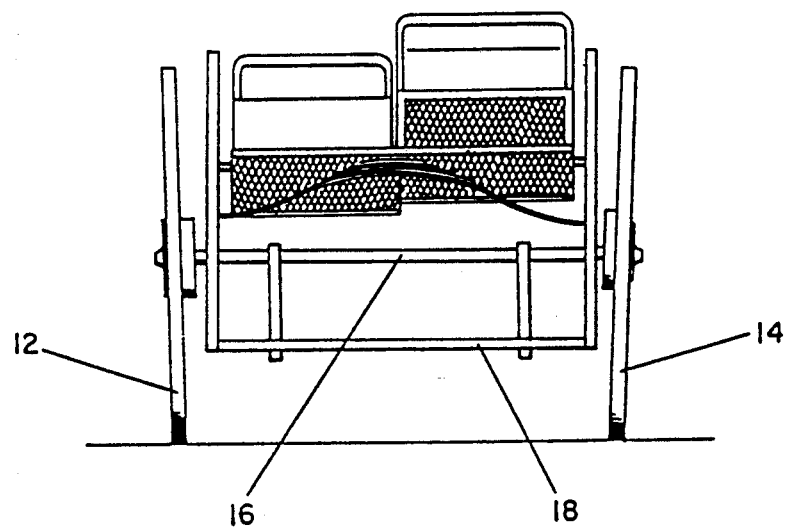
FIG. 2 is a rear view of the FIG. 1 embodiment.

FIGS. 1-4 illustrate a preferred embodiment of the invention, comprising a two-wheeled, horse drawn vehicle or carriage 10 comprising a pair of wheels 12 and 14 and axle 16, a frame 18 having a pair of wooden shafts 20 extending therefrom and which are reinforced by steel strips 22 extending a substantial portion of the length thereof which hold the horse and carriage together should the shafts break. The frame 18 contains object deflectors 24 and 26 positioned in front of wheels 12 and 14. Deflectors 24 and 26 provide protection from snagging a fence post, tree, shrubbery, or the like, between the frame 18 of the carriage 10 and a wheel 12 or 14. At relatively high speeds, object-deflector engagement will literally jump the carriage sideways when a sturdy post or tree is encountered. Deflectors 24 and 26 also uniquely serve as steps for the driver or passenger.

The preferred embodiment 10 is also provided with wheel guards 28 and 30 mounted on frame 18 and spaced from wheels 12 and 14. The wheel guards prevent driver or passenger clothing from entangling in the spokes of the wheels while the carriage is in motion and also provide hand holds for the driver and the passenger, whether the passenger is seated on a relatively low position passenger's seat 32 adjacent a higher driver's seat 31, or whether the passenger is standing on removable platform 34. The wheel guards 28 and 30 provide safety for the driver and passenger since the tendency of an individual riding on a violently moving carriage is to reach out and grab something to the side for stability or to keep from falling off the carriage. If a person is thrown either way, he would instinctively grab the wheel while it is in motion. Thus, the wheel guards 30 and 28 serve as protective grab bars. The carriage 10 is also provided with foot retainer 36 mounted on the front thereof whereby the driver or the passenger can place the toes of his shoes under the foot bar 36 to help retain his position on the carriage. Seats 31 and 32 are provided with short backs 37 and 38 which can also be gripped by a passenger riding on removable platform 34.

FIG. 3 further shows a removable platform assembly 34 on which a passenger can stand. As can be seen, frame 18 is mounted on axle 16 using a conventional transverse elliptical spring suspension 56. Each side of frame 18 has a removable bracket 58 mounted thereon. Each bracket 58 comprises two retainers 60 and 62 through which pins 64 on the seat assembly 66 serve to mount the seat assembly 66 onto frame 18. When the rear platform 34 is not used on the carriage, the seat assembly 66 is preferably mounted to the frame 18 using rearwardly disposed retainer 62; whereas when the platform assembly 34 is to be used, the seat assembly 66 is preferably mounted using pins 64 to forward retainer 60 so that the carriage is balanced as desired and the load on the wooden shafts 20 is appropriate for a horse drawn carriage. As can be seen, the seat assembly 66 comprises removable seat cushions 31 and 32. Brackets 58 are removably attached to frame 18 using bolts 68 and nuts 70 which are preferably vibration proof.

Reference is now made to FIG. 5 which shows how the forward ends 21 of the wooden shafts 20 can be supplied with a transverse structure for bridging them in order to avoid snagging a fence post, shrubbery, tree, or the like between the shafts 20 and a horse positioned therebetween pulling the carriage. A transverse element 40 in accordance with the invention will thereby prevent accidents and injuries to the horse and the driver and to any passenger on the carriage from such an incident. In a preferred embodiment, the transverse element 40 is constructed of leather; however, those practicing the art will recognize that any semiresilient material, such as a plastic, metal, or wood can also be used. As can be seen, ends 42 of element 40 are made in a tubular fashion and curve from element 40 so as to fit over forward ends of shafts 20. They slip on snugly and can be buckled using straps 44, buckles 46, straps 48, and D-rings 50, the straps 48 being riveted, screwed, or otherwise affixed by devices 52 to shafts 20. Those practicing the art will recognize that glue or an adhesive, Velcro ®, or any readily available fastening means can also be used. However, those in the horse and carriage art will recognize that wood and leather, when joined with metal buckles, are traditional components and are aesthetically pleasing as well as functional. Element 40 is formed to fit positioned across shaft 20 to be spaced from but conform to the neck of the particular horse used to pull the carriage. It is sufficiently flexible to be comfortable for the horse yet rigid and strong enough to perform its desideratum of protection.

The invention has been described in detail with particular reference to a preferred embodiment thereof, but it will be understood that variations and modifications can be effected within the scope of the invention.

What is claimed is:

1. For use on a horse drawn vehicle comprising at least one pair of wheels, a suspension, a carriage frame, and a pair of shaft means having forwardly extending ends and between which a horse is harnessable, improvements comprising:

unitary one-piece means having ends and longitudinally adjustably attachable at each said end thereof to each said forwardly extending end of said pair of shaft means for bridging the forward ends of said pair of shaft means to substantially eliminate the possibility of snagging an object between the end of one of said shaft means and the horse, when the vehicle is being pulled by a horse and is in motion.

2. The invention of claim 1 wherein said unitary bridging means is semi-resilient.

3. The invention of claim 1 wherein said unitary bridging means is made of leather.

4. The invention of claim 1 wherein said unitary bridging means is shaped to conform about but be spaced from the neck of a horse.

5. The invention of claim 1 wherein said unitary bridging means comprises a transverse member having ends telescopically fittable over the forward ends of the shaft means.

6. The invention of claim 5 wherein said unitary bridging means further comprises adjustable means for affixing said transverse member ends to the forward ends of the shafts.

7. For use on a horse drawn vehicle comprising at least one pair of wheels, a suspension, and a carriage frame, improvements comprising:

a pair of shafts having forwardly extending ends and between which a horse is harnessable, said shaft comprising wood and reinforced thereunder a substantial length thereof with a metal element; and unitary one-piece means having ends and longitudinally adjustably attached at each said end thereof and bridging the forward ends of said pair of shafts to substantially eliminate the possibility of snagging an object between the end of one of the shafts and the horse, when the vehicle is being pulled by a horse and in motion.

8. The invention of claim 7 wherein said improvements further comprise deflector means mounted ahead of the wheels on the carriage whereby an object is deflected away from between the carriage and the wheel, and not snugged therebetween.

9. The invention of claim 7 further comprising arcuate wheel guards for providing gripping members for persons in the vehicle and providing protection from inadvertent gripping of a revolving wheel by any such person.

10. The invention of claim 7 further comprising a removable platform substantially as wide as said carriage frame for a standing passenger mountable behind the driver's seat.

11. The invention of claim 10 further comprising an adjustable driver's seat, mountable in a forward position when said removable platform is mounted on the vehicle and a rearward position when said removable platform is removed from the vehicle.

* * * * *